US009479526B1

(12) United States Patent
Yang

(10) Patent No.: US 9,479,526 B1
(45) Date of Patent: Oct. 25, 2016

(54) DYNAMIC COMPARATIVE ANALYSIS METHOD AND APPARATUS FOR DETECTING AND PREVENTING CODE INJECTION AND OTHER NETWORK ATTACKS

(71) Applicant: Shape Security, Inc., Palo Alto, CA (US)

(72) Inventor: Siying Yang, Cupertino, CA (US)

(73) Assignee: SHAPE SECURITY, INC., Palo Alto, CA (US)

( * ) Notice: Subject to any disclaimer, the term of this patent is extended or adjusted under 35 U.S.C. 154(b) by 33 days.

(21) Appl. No.: 14/541,062

(22) Filed: Nov. 13, 2014

(51) Int. Cl.
*H04L 29/06* (2006.01)
*G06F 21/50* (2013.01)

(52) U.S. Cl.
CPC ........... *H04L 63/1433* (2013.01); *G06F 21/50* (2013.01); *H04L 63/14* (2013.01)

(58) Field of Classification Search
CPC ............... H04L 63/1433; H04L 63/14; H04L 29/06904; G06F 21/50; G06F 21/52; G06F 21/53; G06F 21/55; G06F 21/554; G06F 21/57; G06F 21/577
USPC .............................................. 726/25, 23, 22
See application file for complete search history.

(56) References Cited

U.S. PATENT DOCUMENTS

| 5,509,076 A * | 4/1996 | Sprunk ................... G11C 7/24 380/1 |
| 7,058,699 B1 | 6/2006 | Chiou et al. |
| 7,464,326 B2 | 12/2008 | Kawai et al. |
| 7,895,653 B2 | 2/2011 | Calo et al. |
| 8,170,020 B2 | 5/2012 | Oliver et al. |
| 8,453,126 B1 | 5/2013 | Ganelin |

(Continued)

FOREIGN PATENT DOCUMENTS

| CN | 101471818 A | 7/2009 |
| WO | 2008095018 A2 | 8/2008 |

(Continued)

OTHER PUBLICATIONS

Cova et al., "Detection and Analysis of Drive-by-Download Attacks and Malicious JavaScript Code," World Wide Web Conference Committee, Apr. 26-30, 2010.

(Continued)

*Primary Examiner* — William Goodchild
(74) *Attorney, Agent, or Firm* — Davis Wright Tremaine LLP; Philip H. Albert

(57) ABSTRACT

A security appliance includes a vulnerable testbed that simulates at least one known vulnerability, and a secure testbed that simulates not having that vulnerability. A testbed monitor monitors run-time behavior of the vulnerable testbed and the secure testbed, obtaining at least one run-time behavior parameter. A comparative evaluator module compares the run-time behavior parameters with respect to the received client request to determine if it is legitimate or illegitimate. The security appliance outputs its determination with a message and/or by forwarding client requests deemed legitimate and dropping client requests deemed illegitimate. The determination can be based, on differences in the run-time behavior parameters. Illegitimate requests can be cached for later matching. The requests can be database data requests, XML formatted requests, operating system requests and/or other types of requests that would be differentially handled by a vulnerable server and a secure server.

32 Claims, 16 Drawing Sheets

(56) References Cited

U.S. PATENT DOCUMENTS

| | | |
|---|---|---|
| 8,555,388 B1 | 10/2013 | Wang et al. |
| 8,561,193 B1 | 10/2013 | Srivastava et al. |
| 8,589,405 B1 | 11/2013 | Estan |
| 8,677,481 B1 | 3/2014 | Lee |
| 8,689,330 B2 | 4/2014 | Sinn et al. |
| 8,762,962 B2 | 6/2014 | Ben-Artzi et al. |
| 2002/0199116 A1 | 12/2002 | Hoene et al. |
| 2004/0088651 A1 | 5/2004 | McKnight et al. |
| 2005/0216770 A1 | 9/2005 | Rowett et al. |
| 2005/0240999 A1 | 10/2005 | Rubin et al. |
| 2005/0251536 A1 | 11/2005 | Harik |
| 2006/0053295 A1 | 3/2006 | Madhusudan et al. |
| 2006/0288418 A1 | 12/2006 | Yang et al. |
| 2007/0011295 A1 | 1/2007 | Hansen |
| 2007/0064617 A1 | 3/2007 | Reves |
| 2009/0070459 A1 | 3/2009 | Cho et al. |
| 2009/0099988 A1 | 4/2009 | Stokes et al. |
| 2009/0241174 A1 | 9/2009 | Rajan et al. |
| 2010/0235637 A1 | 9/2010 | Lu et al. |
| 2010/0235910 A1 | 9/2010 | Ku et al. |
| 2010/0287132 A1 | 11/2010 | Hauser |
| 2011/0154308 A1 | 6/2011 | Lobo |
| 2011/0320816 A1 | 12/2011 | Yao et al. |
| 2012/0198528 A1 | 8/2012 | Baumhof |
| 2013/0263264 A1 | 10/2013 | Klein et al. |
| 2014/0283038 A1 | 9/2014 | Call et al. |
| 2014/0298469 A1* | 10/2014 | Marion .................. G06F 21/55 726/23 |
| 2015/0058992 A1 | 2/2015 | El-Moussa |

FOREIGN PATENT DOCUMENTS

| | | |
|---|---|---|
| WO | 2008095031 A1 | 8/2008 |
| WO | 2008130946 A2 | 10/2008 |

OTHER PUBLICATIONS

Egele et al., "Defending Browsers against Drive-by Downloads: Mitigating Heap-Spraying Code Injection Attacks," Detection of Intrusions and Malware, and Vulnerability Assessment, 5587 of the series Lecture Notes in Computer Science, 2009, pp. 88-106, Springer Berlin Heidelberg.

Hofmeyr et al., "Intrusion Detection using Sequence of System calls," Journal of Computer Security, 6(3), 1998, pp. 151-180.

Oh, "Recent Java exploitation trends and malware," Black Hat USA 2012, Retrieved from the Internet; <URL: https://media.blackhat.com/bh-us-12/Briefings/Oh/GBH_US_12_Oh_Recent_Java_Exploitation_Trends-and_Malware_WP.pdf>, 27 pages.

Pattabiraman et al., "DoDOM: Leveraging DOM Invariants for Web 2.0 Application Robustness Testing," 2010 IEEE 21st International Symposium on Software Reliability Engineering, Nov. 1-4, 2010, pp. 191-200.

Rieck et al. "Cujo: Efficient Detection and Prevention of Drive-by-Download Attacks," ACSAC 2010, Austin, Texas, Dec. 6-10, 9 pages.

* cited by examiner

```
<html>
<body align=center>
        <form id="user_login" action="user_login.php" method="post">
                Username:  <input type=text name="username" id="username"> <br>
                Password:  <input type="password" name="password" id="password"> <br>
                <input type="submit" id="login_submit" value="Login">
        </form>
</body>
</html>
```

```
<?php
    $username = $_POST['username'];
    $password = $_POST['password'];
    $my_con = mysql_connect("localhost", "webuser", "pa55w0rd");
    mysql_select_db("user_database");
    $my_cmd = "SELECT username, password, firstname, lastname FROM user_table WHERE
    username='" . $username . "' AND password='" . $password . "';";
    $result = mysql_query($my_cmd);
    if ($result) {
        echo "<table class='hoverTable' align='center'>";
        echo "<tr><th>Username</th><th>Password</th><th>First Name</th><th>Last Name</th></tr>\n";
        while ($my_row = mysql_fetch_assoc($result)) {
            echo "<tr>\n";
            echo "<td>" . $my_row['username'] . "</td>\n";
            echo "<td>" . $my_row['password'] . "</td>\n";
            echo "<td>" . $my_row['firstname'] . "</td>\n";
            echo "<td>" . $my_row['lastname'] . "</td>\n";
            echo "</tr>\n";
        }
        echo "</table>";
    }
    mysql_close($my_con);
?>
```

FIG. 8

| Username | Password | Firstname | Lastname |
|---|---|---|---|
| alice | a1b2c3d4 | Alice | White |
| bob | Ab3abe8asdg7 | Bob | Smith |
| catherine | T35tpa55w04d | Catherine | Wong |
| david | Rs4ag5ad | David | Young |
| ... | ... | ... | ... |

FIG. 9

| Username | Password |
|---|---|
| frank | h1i2j3k4 |
| george | asdfas4adf2 |
| hans | tas4wert4 |

FIG. 10

```
//Testbed code for low/no security testbed

<?php
    ...
    $my_cmd = "SELECT username, password FROM test_table WHERE username='" .
$username . "' AND password='" . $password . "';";
    $result = mysql_query($my_cmd);
    ...
?>
```

FIG. 11

```
//Testbed code for high security testbed

<?php
    ...
    $mysqli = new mysqli("localhost", "my_user", "pa55w0rd", "test_database");
    ...
    $my_stmt = $mysqli->prepare("SELECT username, password FROM test_table WHERE
username=? AND password=?");
    $my_stmt->bind_param('ss', $username, $password);
    $my_stmt->execute();
    $result = $my_stmt->get_result();
    ...
?>
```

FIG. 12

| Inputs | Outputs | | Decision |
|---|---|---|---|
| | Vulnerable Testbed | Secure Testbed | |
| -Username: frank<br>-Password: h1i2j3k4 | Matched record or "no match" depending on input string. | (same) | Legitimate input |
| -Username: abc<br>-Password: ' OR '1'='1 | Entire test table. | No match, since ' OR '1'='1 is treated as a regular password string. | Illegitimate input |

FIG. 13

| Inputs | Error Message | | Decision |
|---|---|---|---|
| | Vulnerable Testbed | Secure Testbed | |
| -Username: frank -Password: h1i2j3k4 | None | None | Legitimate input |
| -Username: abc -Password: 1' RLIKE (SELECT (CASE WHEN (ORD(MID((IFNULL( CAST( DATABASE() AS CHAR),0x20)), 1, 1))>120) THEN 1 ELSE 0x28 END)) AND 'SoJe'='SoJ ' OR '1'='1 | This error-based blind injection causes DBMS error or HTTP response code 500 (Internal server error), if the ASCII value of the database name's first character is not larger than 120. | None, since the whole input is treated as a regular string. | Illegitimate input |

FIG. 14

| Inputs | Timing Behavior | | Decision |
|---|---|---|---|
| | Vulnerable Testbed | Secure Testbed | |
| -Username: frank -Password: h1i2j3k4 | Complete in <100 msec | Complete in <100 msec | Legitimate input |
| -Username: abc -Password: 1'; SELECT SLEEP(5) -- | This time-based blind injection will cause the vulnerable application to sleep for 5 seconds. Complete in >5000 msec | Complete in <100 msec | Illegitimate input |

FIG. 15

| Inputs | Database Behavior | | Decision |
|---|---|---|---|
| | Vulnerable Testbed | Secure Testbed | |
| -Username: frank -Password: h1i2j3k4 | No change in test database | No change in test database | Legitimate input |
| -Username: abc -Password: 1'; DROP TABLE test_table | The table "test_table" will be removed after execution. | No change in test database | Illegitimate input |

FIG. 16

```
-    Cached string:
1'; DROP TABLE test_table

-    Input strings considered as partial match
1'; DROP TABLE test_table --
1'; DROP TABLE test_table_1 --
1'; DROP TABLE test_table_2 --
```

```
<accounts>
    <account>
        <username>root</username>
        <password>xYz1a2b3c</password>
        <userid>0</userid>
        <email>root@example.com</email>
    </account>
    <account>
        <username>alice</username>
        <password>a1b2c3d4</password>
        <userid>301</userid>
        <email>alice@example.com</email>
    </account>
</accounts>
```

```
<accounts>
    <account>
        <username>root</username>
        <password>xYz1a2b3c</password>
        <userid>0</userid>
        <email>root@example.com</email>
    </account>
    <account>
        <username>alice</username>
        <password>a1b2c3d4</password>
        <userid>301</userid>
        <email>alice@example.com</email>
    </account>
    <account>
        <username>bob</username>
        <password>xYz123</password>
        <userid>302</userid>
        <email>bob@example.com</email>
    </account>
</accounts>
```

FIG. 23

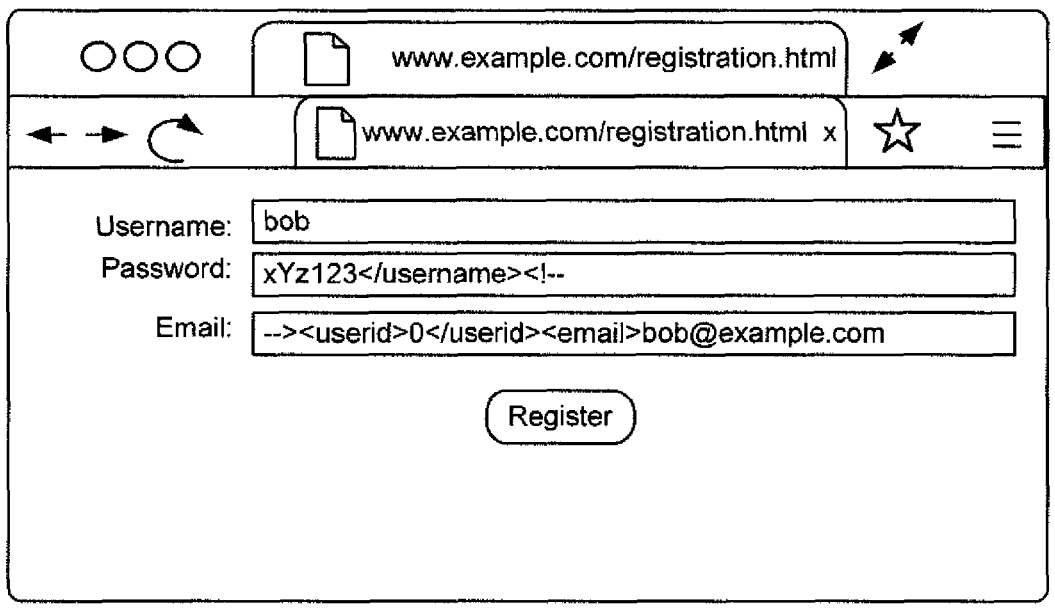

FIG. 24

```
<accounts>
    <account>
        <username>root</username>
        <password>xYz1a2b3c</password>
        <userid>0</userid>
        <email>root@example.com</email>
    </account>
    <account>
        <username>alice</username>
        <password>a1b2c3d4</password>
        <userid>301</userid>
        <email>alice@example.com</email>
    </account>
    <account>
        <username>bob</username>
        <password>xYz123</password><!--</password>
        <userid>302</userid>
        <email>--><userid>0</userid><email>bob@example.com </email>
    </account>
</accounts>
```

FIG. 25

```
<account>
        <username>bob</username>
        <password>xYz123</password>
        <userid>0</userid>
        <email>bob@example.com </email>
</account>
```

FIG. 26

```
<?php
    $filename = $_GET['filename'];
    system("rm $filename");
?>
```

FIG. 29

```
uid=302(u302) gid=20(staff)
groups=20(staff),501(access_bpf),12(everyone),61(localaccounts),79(_appserver
usr),80(admin),81(_appserveradm),98(_lpadmin),402(com.apple.sharepoint.group
.2),33(_appstore),100(_lpoperator),204(_developer),398(com.apple.access_scree
nsharing),399(com.apple.access_ssh),401(com.apple.sharepoint.group.1)
```

FIG. 30

DYNAMIC COMPARATIVE ANALYSIS METHOD AND APPARATUS FOR DETECTING AND PREVENTING CODE INJECTION AND OTHER NETWORK ATTACKS

FIELD OF THE INVENTION

The present invention relates generally to network computer system security and more particularly to defense against some attacks on the network computer system such as code injection attacks.

BACKGROUND

The Internet (and related networks) can be used to send e-mails, conduct business, automate machinery and used for data processing. Connected users can use the Internet to interact with other connected users and/or connected computer systems. One such interaction is a web browser (an example of a web client) and web server interacting.

In a simple use of the Internet, a web browser running on a computer connected to the Internet makes a request directed at a web server that is connected to the Internet. Assuming that the web server has the requested page and the web server determined that the requested web page is OK to send, the web server responds to the web browser with the requested web page. If the web server is programmed to allow any requester to access a copy of any web page on the web server, security is simple. The web server just checks whether the request includes the exact URL of a page that web server has. For some uses, that is sufficient. As complexity of web services has expanded, web servers are often expected to do more, such as serving dynamic pages, e.g., web page content that is compiled or generated after the request is received.

Dynamic pages are useful, such as for a query-response scenario, wherein the URL submitted by a web browser in an HTTP request is not for a static, pre-existing page, but is a URL that encodes data, using "<FORM>" fields or other protocols, where the data is intended to be processed by the web server. For example, a web browser might send an HTTP request that essentially says "Please query the personnel directory and return me a list of all of the employees that match the query 'lastname=S*'". Upon receipt, the web server might submit the query string to a database management server back end, wait for the response, format the database response into a HyperText Markup Language ("HTML") page and return that to the requesting web browser.

If that was all that the web server could do, and the personnel list was public, it might not matter what requests are sent and by what computers or web browsers. However, the typical web service configuration might be more complicated. For example, the database might respond to harmful queries and cause data breaches, data loss or other ill effects. In such cases, it might be possible for a web browser (or a computer program programmed by an attacker for exactly this purpose) to send a malformed request to the web server that the server would then pass to the database management system that would return to the web browser all of the data in the database, modify data, destroy data in the database, or perform other malicious operations.

Often, these types of attacks are referred to as "code injection" attacks. In a code injection attack, a secured system expects data (strings, queries, structured data, URLs, etc.) that inform the secured system about a request being made. When data that is received is in the expected form, the secured system executes programs that are intended to process valid requests. However, when an attacker submits a request that is not in the normal form, has escape sequences, command statements, or other features, that request might have an effect of running program code designed for the attacker's benefit rather than subject to the constraints intended by the secured system designers. One way to view these actions is that the attacker is using a data submission mechanism to inject program code that the attacker wants run and perhaps the designers of the secured system did not intend to be allowable.

Code injection is known and barriers to code injection are also known. For example, submitting the string "'OR '1'='1'" as part of a password entry can result in a reply that contains an entire secured database. As a result, many secured systems will have a parser or filter that would drop requests that use single quotes as part of their data, or would at least filter those out. Unfortunately, attackers know this and will try and exploit this vulnerability in unpatched servers or try other escape sequences or code injection avenues. This constant one-upmanship keeps server security and administrators busy. Not only do they have to maintain their systems, they also have to apply patches to complex systems and keep up with new modes of attack as they come up.

Improved security methods and apparatus could be used to ease this burden.

SUMMARY OF THE EMBODIMENTS

A security appliance is present in a network path between client computers or computing devices and a secured server and comprises a network interface over which client requests for the secured server can be received, before, during or after their receipt by the secured server, a vulnerable testbed, wherein the vulnerable testbed is configured to simulate a vulnerable server response to a received client request, simulated to have at least one known vulnerability, a secure testbed, wherein the secure testbed is configured to simulate a server response to the received client request, simulated to not have the at least one known vulnerability, a testbed monitor that monitors run-time behavior of the vulnerable testbed and the secure testbed, obtaining at least one run-time behavior parameter, a comparative evaluator module that compares at least one run-time behavior parameter for each of the vulnerable testbed and the secure testbed with respect to the received client request, and a test output that signals whether the security appliance determines the received client request to be a legitimate request or an illegitimate request, wherein the determination is based, at least in part, on any differences in the run-time behavior parameter for each of the vulnerable testbed and the secure testbed.

The security appliance might handle legitimate request by forwarding them to the secured server and dropping illegitimate requests. The security appliance might simply forward a message indicating its determination, possibly including a reference to the request if necessary. The determination can be based on whether the run-time behavior parameter for the vulnerable testbed exactly matches the run-time behavior parameter for the secure testbed, or if that it matches within a tolerance.

After each test, the security appliance can reset for the next request, possibly caching known illegitimate requests for later cache matching, resetting applications and databases to a known form, and the like.

The requests can be database requests, XML formatted requests, operating system requests and/or other types of requests that would be differentially handled by a vulnerable server and a secure serve The following detailed description together with the accompanying drawings will provide a better understanding of the nature and advantages of the present invention.

BRIEF DESCRIPTION OF THE DRAWINGS

FIG. 8 illustrates an example PHP script for querying a backend database and replying.

FIG. 9 illustrates an example database table.

FIG. 10 illustrates an example test database.

FIG. 11 illustrates a portion of a PHP script for part of a test application of a vulnerable testbed.

FIG. 12 illustrates corresponding code of a secure testbed application.

FIG. 13 is a table comparing query outputs for vulnerable and secure test applications.

FIG. 14 is a table comparing error messages as between vulnerable and secure test applications.

FIG. 15 is a table comparing execution timing as between vulnerable and secure test applications.

FIG. 16 is a table comparing database status after execution.

FIG. 23 illustrates the XML database of FIG. 21 after update with the request of FIG. 22.

FIG. 24 illustrates the web page of FIG. 20 with fields filled in with an XML attack vector, an illegitimate XML injection.

FIG. 25 illustrates the XML database of FIG. 21 after update with the illegitimate request of FIG. 24.

FIG. 26 illustrates an attacked portion of the XML database of FIG. 21 after update with the illegitimate request of FIG. 24.

FIG. 29 illustrates program code that might be used to process a request obtained via the web page of FIG. 28.

FIG. 30 illustrates an output of the program code of FIG. 29 when a particular OS injection attack occurs.

Figure 1:
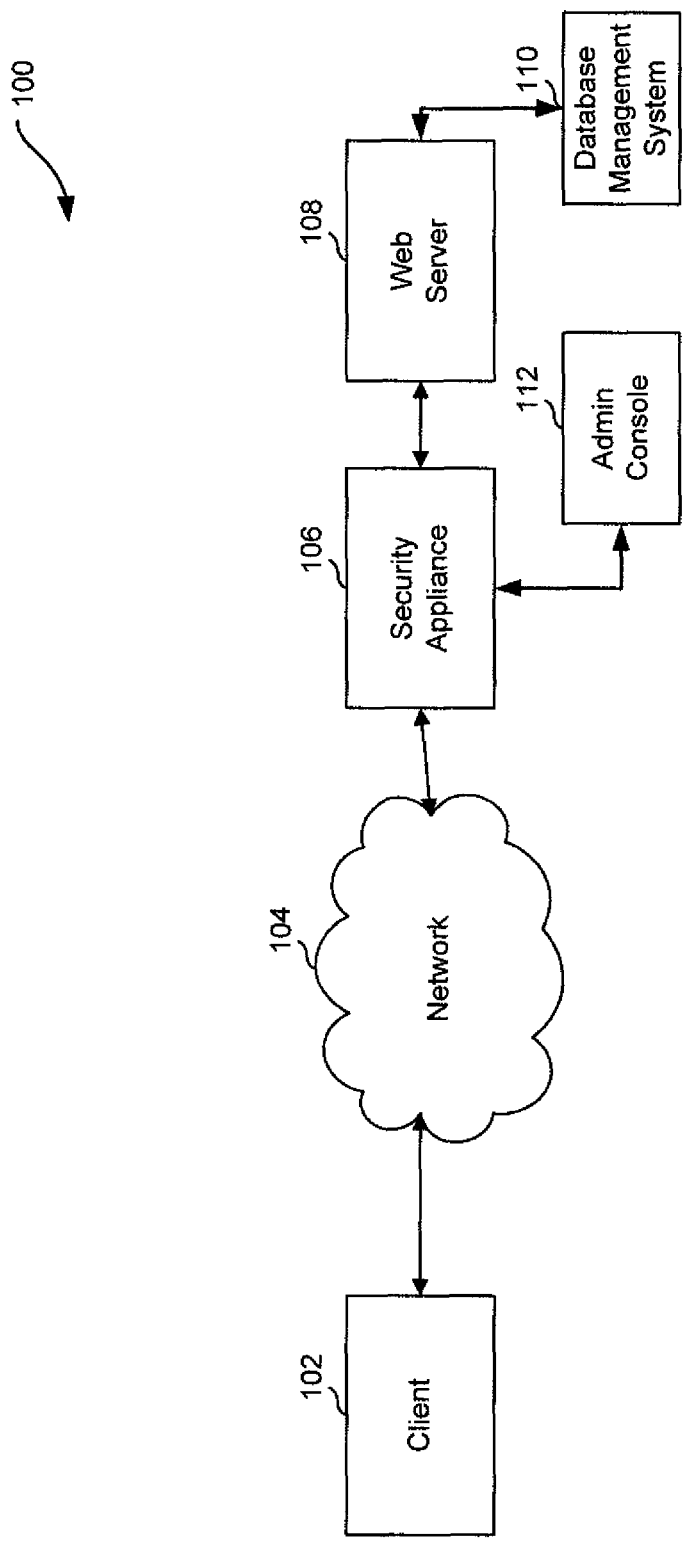
FIG. 1 is a block diagram of a simple case of a security appliance that protects a server using dynamic comparative analysis.

In the figures, like reference symbols in the various drawings indicate like elements, and multiple instances of objects might be denoted parenthetically (e.g., 101(1), 101(2), . . . , 101(n)). Where numbered objects in figures are shown with parenthetical sub-numbers ranging from 0 or 1 up to some letter designation (e.g., "1, 2, . . . , k" or 1, 2, . . . , n"), it should be understood that the letter designation represents some finite number the value of which is not essential for the understanding of the invention, unless otherwise indicated.

DETAILED DESCRIPTION

Network resources might include information, financial value, computing resources, or the like. For example, online-stored e-mails, online-stored personal photo, bank accounts with online transfer capability, online shopping services, computing power, etc., are all forms of network resources.

Network services might include uploading data, downloading data, interacting with server-side programs over a network, access to physical resources (e.g., printers, cameras, other equipment, etc.), communication services, or similar services that might be provided over a network. Network services might be provided by an HTTP server coupled to a back-end data processing system, or the like. Other network protocols might be used, as appropriate.

The network can be the Internet, an intranet, an extranet, a LAN, WAN or similar network that connects computers/devices/systems at network nodes to at least some other network nodes, thereby allowing users to use the network services.

As used herein, at least for the sake of readability, participants in a transaction might be referred to as a "user" and a "network service provider" but it should be understood that these labels might sometimes refer to humans or computers as users and/or persons, business groups, organizations, etc. as network service providers, even though specifically and technically it may well be that an electronic device operated by, or at the behest of, a user is what is doing the interaction and the interaction is with computer/electronic hardware operated by, or at the behest of, a network service provider.

Electronic user devices might include computers, tablets, wearable computer devices, smartphones, embedded computer systems, or other devices.

A web application executing on a web server, or other computing platform that might be subject to attacks, might contain web pages, scripts, databases, operating system components, and the like, each possibly introducing vulnerabilities. Web pages might use HTML, CSS and JavaScript, which have some known and unknown attack vectors. A web server itself might have weaknesses in the software executing the web services, such as the Apache web server, the Cherokee web server, the Lighttpd web server, the Nginx web server, and the like. Some web servers will execute Common Gateway Interface ("CGI") scripts that might be written in languages such as Perl, PHP, Python, etc. Some web servers will interface with database management systems, such as a MySQL server, a Microsoft SQL server, a DB2 server, an Oracle DBMS, a PostgreSQL server, or the like. Web servers might be executing on operating system that also might introduce vulnerabilities, such as the Linux operating system, the Solaris operating system, the Microsoft Windows operating system, etc.

Overview of Code Injection

Code injection is a common attack vector against computer applications. In a code injection attack, adversaries embed malicious code into user input that is supposed to be pure data. If a backend application fails to validate the user input data appropriately before use, it might execute the maliciously injected code. Code injection attacks are frequently seen with SQL, LDAP, Xpath, XML and OS shell. In the examples herein, a common example will be SQL injection, but it should be understood that, unless otherwise indicated, these teachings apply to other types of attacks.

In a SQL injection attack, the attacker injects malicious SQL statements into the data entries on HTML forms. If the backend database application does not validate the data entries appropriately, the injected malicious statements will cause unexpected database operations. In some extreme cases, the attacker may gain complete control of the entire backend database.

There are some existing solutions to deal with SQL injection attacks, but each is lacking. For example, an intermediate security device can attempt to validate data input to disallow maliciously injected SQL statements, but that generally requires the intermediate security device be specifically programmed for anticipated injection vectors. For example, if spurious single quote marks are known to permit code injection, the intermediate security device can filter out all single quote marks or drop requests that have single quote marks. This works until the attackers learn that, for example, using spurious semicolons is a workable attack vector. Then the intermediate security device needs to be reprogrammed to deal with semicolons, and so on.

As another example, a string that includes the substring "1=1" is likely a code injection attack string, as "1=1" as a conditional expression that always evaluates to the "true" condition. If the intermediate security device just filtered out all strings containing "1=1" it would still be vulnerable to attacks when the attackers switch to using "2=2", "3=3", "'a'='a'", "1<2", etc. A challenge for a security device programmed in this way is to cover all possible vectors in advance.

Another way to deal with SQL injection attacks is to use best programming practice throughout backend database application development. This is often impractical, especially where legacy code needs to be used that was developed without injection attacks in mind. Also, human errors can creep in where a code base is large and complex.

Where the backend database application development did not fully follow best programming practice everywhere, the backend database application can be statically analyzed to find places in the application where such practice was not in place.

Even with these approaches, there are still openings for an attacker to gain access to secured data or wreak havoc in the data.

To deal with these and other attack vectors, a security appliance is interposed between clients that make requests (legitimate ones or illegitimate ones) and the server(s) being protected. Herein, a requested interaction that is consistent with the expectations of the designers of the secured services is referred to as a "legitimate" request, whereas a requested interaction that is not consistent with the expectations of the designers of the secured services is referred to as an "illegitimate" request.

In many examples herein, the explanation assumes that the illegitimate request is the result of an attacker forming an attack vector and submitting the attack vector as a request to the services being attacked with the intent of the attacker to go beyond what the designers of the secured services consider a legitimate request. However, illegitimate requests might also include innocent requests that should be blocked. As an example, suppose that a database management system is not programmed to handle characters with umlauts, such as "ü", which is distinct from the character "u". Suppose further that when an umlaut-ed character is present in a string submitted to the database management system, the database management system will crash. A person submitting their first and last name, with innocent intent, that happens to be spelled with a "ü" will crash the database management system. This can be treated as an illegitimate request even though there is no intent to attack the database management system, in part because it has similar effects and is typically addressed in a similar manner, such as by reprogramming components to correctly deal with such characters.

The security appliances might be implemented as separate computer hardware and/or software, or might be executed by a more general purpose machine. Thus, a security appliance can exist in the form of executable instructions that can be executed by a particular processing system. In some implementations, the security appliances are coupled to load balancers and/or are placed in network paths, using proxies or other techniques, such that the web server and web services do not need to be modified in any way to accommodate the security appliances. In such implementations, requests from clients (trusted or untrusted) pass through a security appliance before reaching the web server and if a request is determined to be illegitimate, it is dropped (silently or otherwise) or blocked at the security appliance, while requests determined to be legitimate are forwarded to the web server.

In other implementations, requests might reach the web server and a copy is passed to the security appliance for a passive analysis. In those implementations, the security appliance need not forward the request, but can simply supply a binary signal to indicate to the web server whether the request is deemed legitimate and the web server can take suitable action.

The security appliance might be a service provided by a security apparatus or security service. In such embodiments, the security appliance for determining whether to deem a request legitimate or illegitimate might be integrated with other security and/or monitoring functions. In some implementations, adding a security appliance might not involve adding any hardware at all, while in some implementations, adding a security appliance might involve just adding or allocating additional computing resources and/or memory storage to an existing system. In yet other implementations, a security appliance is a distinct hardware component, such as a rack-mounted, networked, powered box.

FIG. 1 is a block diagram of a simple case of a security appliance that protects a server using dynamic comparative analysis. As illustrated there, an environment 100 includes a client device 102 that is coupled via a network 104 to a security appliance 106. Security appliance 106 is in turn coupled to a web server 108 that interfaces to a database management system ("DBMS") 110. Security appliance 106 also interfaces with an administrative console 112. Forward proxies and/or reverse proxies might be provided as needed.

With dynamic comparative analysis, a proposed request is submitted to two testbeds within the security appliance, one being a vulnerable (low security) testbed and the other being a secure (high security) testbed. In other variations, there are more than two testbeds. There might be pairs of testbeds for handling different "dimensions" of vulnerability.

Figure 2:
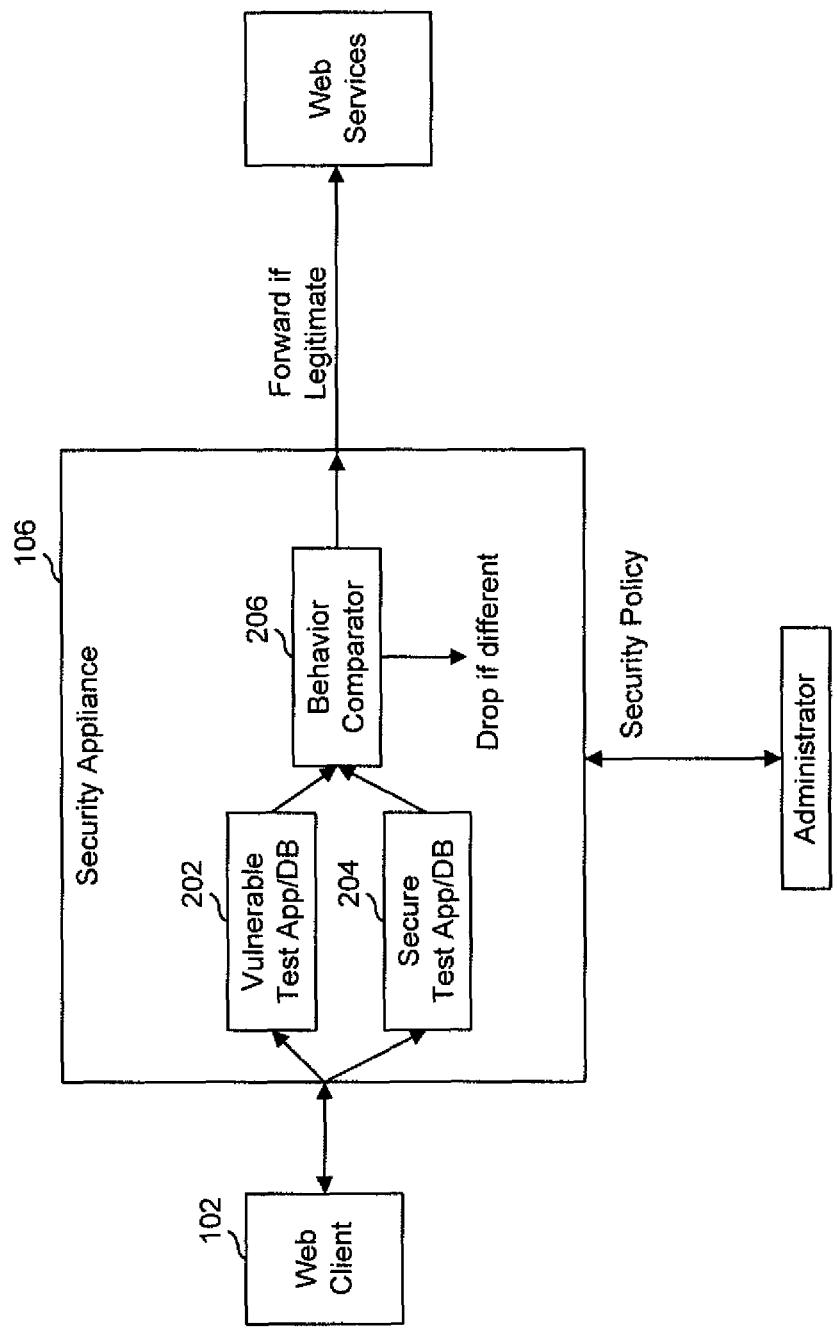
FIG. 2 is a block diagram of a security appliance shown in more detail.

In the example shown in FIG. 2, security appliance 106 includes two testbeds, a vulnerable testbed 202 and a secure testbed 204. The behaviors (explained in more detail below) of the testbeds is compared by behavior comparator 206. Behavior comparator 206, implemented in software or otherwise, makes a determination as to whether a proposed request is a legitimate request or an illegitimate request and takes suitable action. Suitable action might involve forwarding legitimate requests to web services and dropping illegitimate requests. Suitable action might be the output of a binary decision, a weighted decision value or other variation.

Initial State

The testbeds start out in an initial state. Since the proposed request could modify, corrupt and/or change aspects of a testbed, preferably the state of a testbed can be easily reverted to its initial state and preferably the testbed is isolated from other components and systems that are not part of the test process. A testbed might be implemented entirely in software and have an initial state of program code running and databases and data structures set to an initial state. For example, a testbed might comprise a web server program, a database interface, and a database initialized with initial sample records. A testbed might be sandboxed.

In monitoring the testbeds, the security appliance can detect differences in behavior between the vulnerable testbed and the secure testbed. Behaviors might include changes on the database, execution time, or other measurable or detectable behaviors. If the behaviors are the same, the security appliance can flag the proposed request as being a legitimate request. If the behaviors are very different, the security appliance should flag the proposed request as being an illegitimate request. Where the behaviors are different, but only slightly (say a 102 microsecond execution time versus a 108 microsecond execution time), the security appliance might be configured to make a tolerance test. The exact details of the tolerance test might be user configurable. For example, a configuration file might contain a user-specified percentage (such as 1%, 5%, 12%, etc.) that the security appliance would use to set a tolerance percentage. If the measurement of testbed behavior between the vulnerable testbed and the secure testbed differs but differs by less than the user-specified percentage, the security appliance would nonetheless flag that proposed request as being a legitimate request.

Once the security appliance has made a decision, or sooner, the security appliance can reset the testbeds using a reset module to their initial state to prepare for subsequent proposed requests to be tested. In some implementations, for efficiency, if the security appliance determines that a testbed's state has not changed or is insufficiently changed, the security appliance can skip the reinitialization process. Preferably, the testbed data is not secret data but is somewhat representative of the data that is maintained in databases managed by the secured web services. For example, if the protected database includes a table of columns {username, lastname, firstname, password, lastlogin}, the testbeds' databases would have those same or similar columns with dummy data instead of real data. In any case, the testbeds are independent of the protected real backend database and application.

Figure 3:
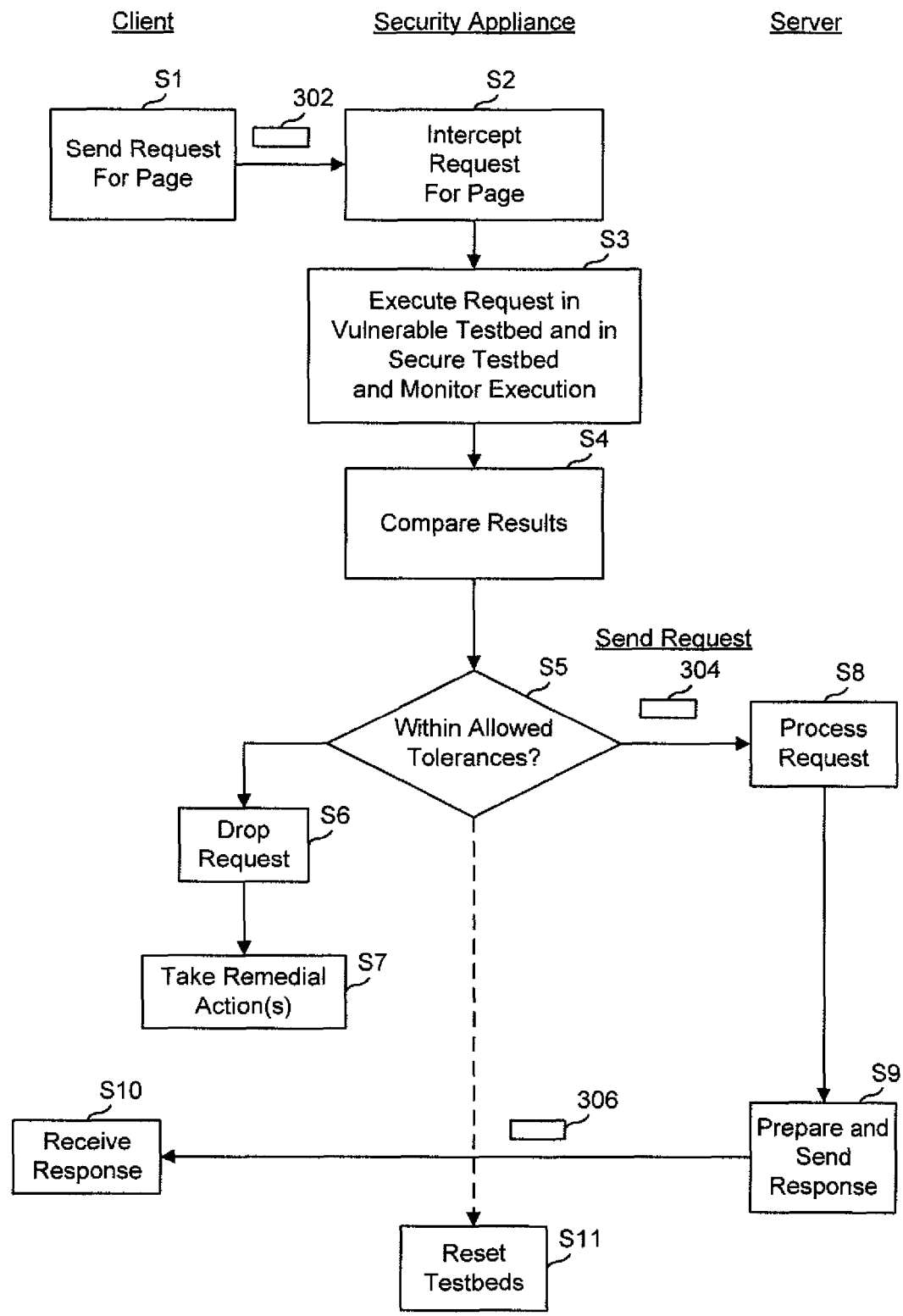
FIG. 3 is a swim diagram of a process wherein a client makes a request and that request is tested at a security appliance using dynamic comparative analysis.

FIG. 3 is a swim diagram of a process wherein a client makes a request and that request is tested at a security appliance using dynamic comparative analysis. As illustrated there, a client sends (step S1) a request 302 directed towards a server or a security appliance. Either way, security appliance obtains (step S2) request 302. The sending client could be a trusted or untrusted, public or private client, so the security appliance can assume initially that the proposed request is not trusted.

The security appliance then executes (step S3) the proposed request, request 302, using a vulnerable testbed and a secure testbed, as detailed above. A behavior comparator or other element of the security appliance compares behavior of the two testbeds (Step S4) and determines whether to flag the proposed request as being legitimate or illegitimate (S5). When the proposed request is flagged as being illegitimate, the proposed request is dropped (S6) and other remedial actions are taken (S7). Examples of remedial actions include filtering out all or part of the request, dropping packets, logging the request, alerting a security console, flagging data, and/or returning an error message.

At step S5, if the proposed request is flagged as being legitimate, the proposed request is sent as request 304 to the server, which then processes it (S8). Request 304 might be in the form of request 302, but in some implementations, such as where the web server already knows the content of the request, request 304 might be in the form of just a binary flag and a request reference ID with the binary flag indicating whether the security appliance deemed the proposed request to be legitimate. It might be possible that the security appliance deems a proposed request to be legitimate when it is actually illegitimate (false negative) or deems a proposed request to be illegitimate when it is actually legitimate (false positive). Preferably, such false positives and false negatives are not common Some implementations described herein will have an extremely low rate of false positives and theoretically no false negatives. Nonetheless, it should not take away from this discussion that a request that is deemed illegitimate is processed as an illegitimate request even if it actually was the case that the request was legitimate in the view of another system.

After processing the request, the server prepares a response (S9) and sends a response 306 to the requesting client, which receives it (S10). Response 306 might be in the form of a web page response.

At some time after the testbed behaviors are measured, the testbeds can be reset (S11), if necessary. In such a reset, testbed dummy databases might be overwritten with initial state dummy databases. This is useful in cases where database changes are detected. Caching might also occur, as explained in more detail below.

In a specific embodiment, each testbed comprises a database with dummy data patterned after the data being protected. In some embodiments, testbeds share databases or other resources. The dummy data might be generated programmatically or by human configuration. Generating the program code of the testbeds might also be done programmatically or by human configuration.

The vulnerable testbed includes vulnerable code, e.g., program code representing a computer application that might be run by the secured web services but written without best programming practices and security techniques. It is not required that the vulnerable testbed be as insecure as possible, so long as there is a difference in implementation between the testbeds. In some embodiments, the vulnerable testbed might not only have been intentionally written without best programming practices and security techniques, but might also have been written specifically to be vulnerable, thus making the vulnerable security testbed into a "no security" testbed or even a "less than no security" testbed, which might be programmed on purpose to be vulnerable to even the simplest attacks.

The secure testbed includes secure code, e.g., program code representing the computer application that might be run by the secured web services and written with best programming practices and security techniques. Preferably, the testbed application code is much simpler than the actual application code run by the secured web services, so that code security is easily observed. For example, the entire code of the secure testbed might be easily readable in one sitting by an experienced programmer.

The security appliance runs the proposed request (or more generally, the received proposed user input) through each testbed's application and compares the run-time behavior from the two applications. If differences are observed, the user input is considered malicious or otherwise illegitimate and handled accordingly. With appropriately chosen test applications and behaviors to compare, this approach can effectively prevent malicious injections, including previously unanticipated vulnerabilities, such as zero-day attacks.

Legitimate user input should be processed identically through both testbed applications, or nearly so. The run-time behavior should be the same with the vulnerable and secure testing applications. For malicious input with SQL injections, the run-time behavior of an "extremely vulnerable" and "completely secure" testing application will be different if there is something malicious or illegitimate about the input. This can be detected even if the type of injection vector is totally unknown. Run-time behavior might include execution time, level of use of resources, database changes, state changes, and/or the like.

With these dynamic comparative analysis techniques, vulnerabilities can be spotted without relying on signatures, knowledge of the input string, knowledge of SQL or other command language syntax. Instead of having to define ahead of time a "natural good standard" such as whitelisting or simple run-time behavior analysis, it is usually difficult to define what can/should be whitelisted, or what the "good" behavior comprises. These dynamic comparative analysis techniques naturally avoid the burden of defining good behavior.

Figure 4:
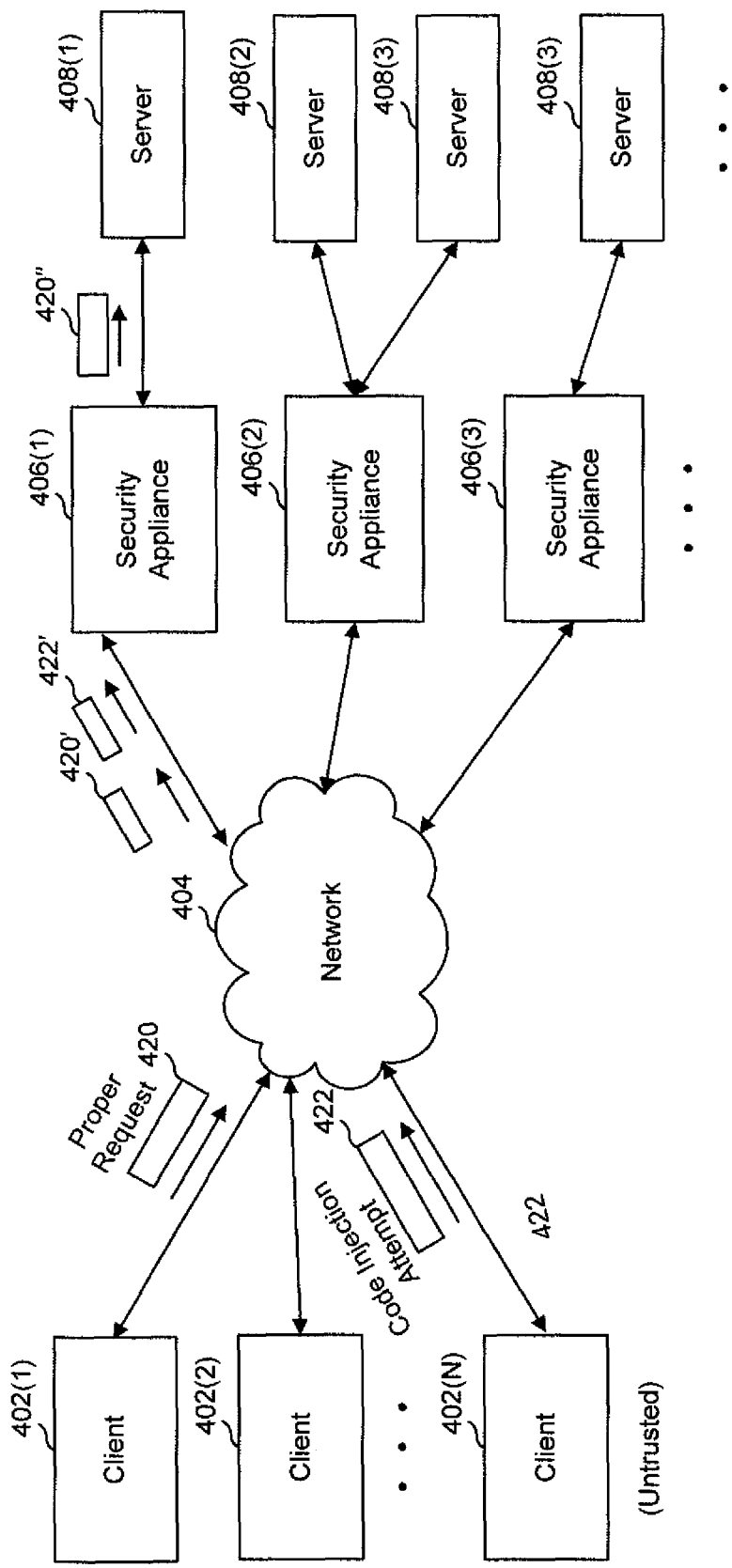
FIG. 4 is a block diagram of a more complex case, illustrating multiple clients, multiple security appliances, and multiple servers.

FIG. 4 is a block diagram of a more complex case, illustrating multiple clients, multiple security appliances, and multiple servers. In some embodiments, each security appliance serves exactly one server. However, variations having security appliances that serve more than one server are possible, as well as security appliances that are quiescent and presently serving no servers. There could be many-to-many correspondences between the clients and the security appliances, and the security appliances would deal with that.

As illustrated in FIG. 4, clients 402 issue requests for services over network 404 to servers 408. Those requests can be routed through security appliances 406 or otherwise intercepted or copied. In the example shown, a properly formatted request 420 is sent by client 402(1) and a code injection attempt is initiated by a request 422 from client 402(N). In this example, both requests happen to go to security appliance 406(1), as they are both addressed to the same security appliance or are both routed there. The requests received by security appliance 406(1) may be the exact requests 420, 422 or might be transformed in some way by network 404, into requests 420', 422'.

As illustrated, a security appliance 406 might serve multiple servers 408. The requests received by servers may be the exact requests received by security appliances, or might be transformed in some way by network 404 and/or the intervening security appliance, into requests such as request 420". Note that request 420" is emitted from security appliance 406(1) to server 408(1), but a request corresponding to request 422' is not, since that request 422' was determined to be illegitimate.

It may be that the security appliances are part of the servers. It may be that the security appliances are at separate network nodes, perhaps maintained by a security service provider and not maintained by the operators of the servers being secured. For high availability, redundancy might be provided.

Figure 5:
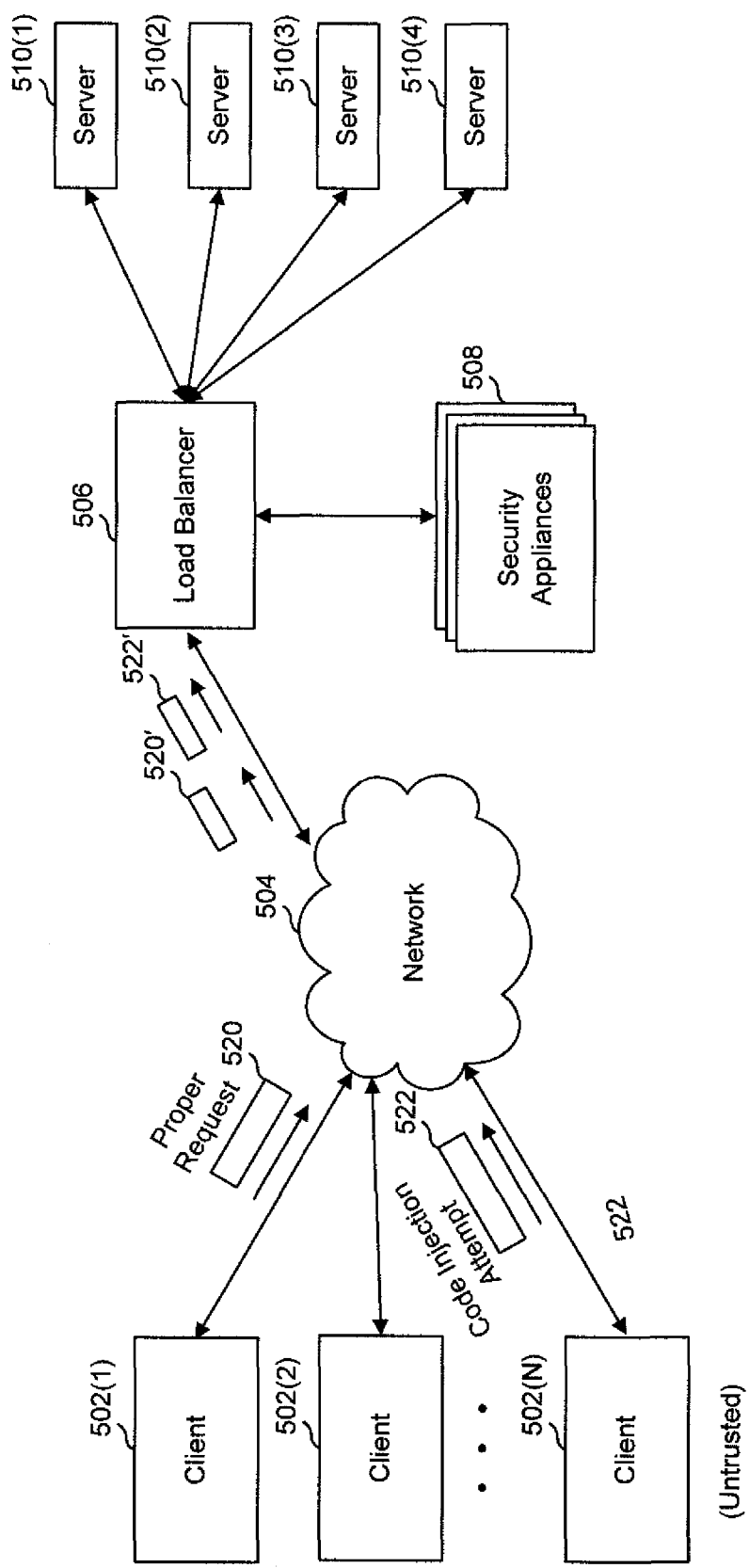
FIG. 5 is a block diagram of a multi-client example that uses a load balancer to distribute work among a plurality of security appliances.

FIG. 5 is a block diagram of a multi-client example that uses a load balancer to distribute work among a plurality of security appliances. As shown there, clients 502 send requests (520, 522) over network 504 to a load balancer 506, possibly with modifications to make requests 520' and 522'. Load balancer 506 routes requests to security appliances 508 and also routes requests to servers 510. Load balancer 506 might hold on to a request and wait for a security appliance legitimate/illegitimate signal before sending legitimate requests on. In other variations, the load balancer turns the request over to one of the security appliances and the assigned security sends legitimate requests to a server, so the load balancer does not need to route the request to servers 510.

Example of Attack Vector

Below is a detailed example of SQL injection targeted at database applications with web interfaces, beginning with FIG. 6, which illustrates a simple web interface for logging in to a service, in the form of a login page 600. A web application provides this simple HTML page, "login.html", containing two input fields, username and password, and one login button.

Figures 6, 7:
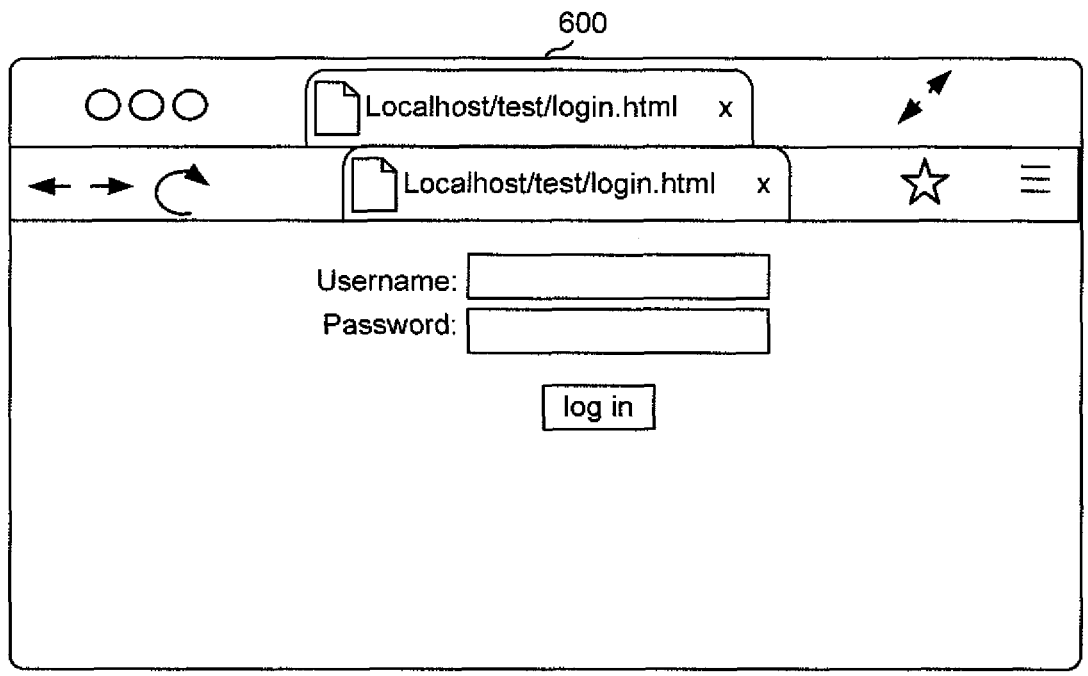
FIG. 6 illustrates a simple web interface for logging in to a service.
FIG. 7 illustrates HTML code for the login page shown in FIG. 6.

FIG. 7 illustrates HTML code 700 for login page 600 shown in FIG. 6. Login page 600 will accept user input in the "Username" and "Password" form fields. When the "Login" button is clicked, a request will be submitted for login processing. That request might normally trigger a PHP script "user_login.php" (illustrated in FIG. 8 as item 800) to query a backend database and reply with user information to display if there is a match.

Suppose the backend database is MySQL and suppose it has a database named "user_database" with a table named "user_table". This table contains four columns named "username", "password", "firstname" and "lastname". It records individual user information. An example table of that database is illustrated in FIG. 9.

PHP script 800 is vulnerable to SQL injection attacks. Specifically line 802 does not validate web input appropriately before use. Suppose the inputs Username="alice" and Password="a1b2c3d4" are provided by the client in a request. PHP script 800 would generate the following corresponding MySQL query command:

SELECT username, password, firstname, lastname FROM user_table WHERE username='alice' AND password='a1b2c3d4';

That works as expected. However, if a client request has the inputs Username="abc" and Password="'OR '1'='1'" (which has data entries with injected SQL statements), PHP script 800 would generate the following corresponding MySQL query command:

SELECT username, password, firstname, lastname FROM user_table WHERE username='abc' AND password='' OR '1'='1';

That query would return all user information (since '1'='1' holds true for all records). In this simple case, it might be apparent that there is a vulnerability and it can be patched, but many applications are too complex to individually study each line of code.

Initial State of Testbeds

The security appliance will generate or obtain two test applications and a test database for a particular protected web page. Collectively, a test application and test database can be considered a testbed. Each testbed (vulnerable and secure) has its own copy of the same test database. Note the test database is much smaller than the actual database. It may contain fewer columns and fewer records, but still cover all the input fields. FIG. 10 illustrates an example test database.

FIG. 11 illustrates a portion of PHP script 800 that might be part of the test application of the vulnerable testbed. As explained above, this is vulnerable code, as the maliciously injected input will be treated as SQL code to be executed.

FIG. 12 illustrates corresponding code of the secure testbed application. Here, maliciously injected input will be treated as arbitrary strings. The secure application can include, among other security measures, the use of parameterized queries so that the maliciously injected input will be treated as arbitrary strings.

In general, for good dynamic comparative analysis, the test database/table should cover all input fields of a web page, the vulnerable testbed should be very easy to attack with basic SQL injections, and the secure testbed should be completely invulnerable to any injections.

The security appliance can generate the testbed applications automatically in some cases. In the example above, the only information specific to web pages is the input fields. The security appliance can automatically look for the input fields on a target web page and then generate the test database and applications based on that information.

Alternatively, the testbed applications and database might be user configurable. Configurations might allow for varying the size of the test database to check time-bound attacks more thoroughly, applying semi-known attack vectors to the vulnerable testbed so a defender can carefully craft the vulnerable test applications to catch such attacks, or perhaps to configure a specially designed secure test application, in addition to the common parameterized query approach. This could be used if the attack is not only on a query, but also on database take-over and/or alteration.

In a hybrid approach, the user might be provided with configurable automatic generation of test applications and databases. In the hybrid approach, the security appliance automatically generates the test applications and database with user configurable parameters and a set of pre-configured application templates an operator can select from. Some examples of user configurable parameters include test database size, number of entries in test table, a selection from a list of pre-configured vulnerable test applications, a selection from a list of pre-configured secure test applications, and the like.

Monitoring Run-Time Behavior

The test database and applications might be generated once for a particular web page. Upon each web input, the test database is instantiated twice, once for the vulnerable testbed and once for the secure testbed. The security appliance will automatically compare the run-time behavior of the two applications on the instantiated test databases. There are a number of behaviors that might be measured, and each might have its own tolerance of variability assigned to it. The more comprehensive the behavior list is, the more accurate the overall detection will be. Other behaviors not listed here might be included.

Compare Query Output: For malicious injections that target retrieving unauthorized information, the vulnerable and secure test applications will generate different output. An example of this is shown in FIG. 13.

Compare DBMS and/or Web Server Error Message: For malicious injections that target exploiting DBMS error messages, the vulnerable and secure testbeds will behave differently, such as generating different DBMS or web server error messages. An example of this is shown in FIG. 14.

Compare Execution Timing: For malicious injections that exploit the backend database's execution duration by purposefully embedding sleep commands, the vulnerable and secure test applications will behave differently. Attackers might be able to infer information about a database by using sleep commands in conditional statements to leak out information. For example, the embedded code "sleep for 5 seconds if the first character of the table name is 't'" and repeating this for each character and each position in the table, an attacker can infer the entire database content from the execution times.

Note that the testbeds might not have identical execution duration, even for legitimate input. However the difference should be small. Both should complete in less than, e.g., 500 milliseconds ("msec") on a regularly loaded system, while malicious injections typically cause a vulnerable application to wait for multiple seconds. A user-configurable threshold can be used to require that the two execution durations should be different within a certain percentage. For example, if the secure test application takes 100 milliseconds to complete, the vulnerable test application should not take more than 200 milliseconds to complete. This can be tuned to avoid false positives. An example of execution timing differences is shown in FIG. 15.

Compare Test Database Status After Execution: Malicious injections may also alter the test database. In this case, the security appliance will check the database status after the test applications are executed. The comparison might be performed bit-by-bit. Any difference, e.g., number of tables, number of records, content of record(s), might result in the proposed request being flagged as illegitimate. An example of this is shown in FIG. 16.

Completing Analysis

When the security appliance is done with making a determination, it can set up for the next proposed request, thus allowing the security appliance to process many, many proposed requests without significantly reducing responsiveness. As part of that reset process, the security appliance can overwrite the test database with the initial test database, skipping this step if the security appliance determines that the data has not changed.

Another aspect of the analysis completion might be to cache those proposed requests that are deemed illegitimate. With the cache populated, the security appliance can flag some matching proposed request without needing to apply it to the testbeds.

Advanced Test Applications

The two example test applications of FIGS. 11 and 12 contain only query functions. This is because the example web page of FIG. 10 involves query operations only. Some web pages require other database operations. For example, a user registration page might invoke record insertion operation and perhaps a table creation operation. For these pages, the test applications would be more involved, containing multiple database operations that are used to make sure none of the web input strings contain malicious injection. In such cases, the test database may also be more complicated, sometimes containing multiple tables.

EXAMPLE

Second-Order SQL Injection Attack

A second-order SQL injection attack is a good example to explain some advanced test applications. Second-order SQL injection attacks typically happen on web pages that involve new record creation. For example, a user registration page contains "username" and "password" field. A second-order SQL injection attack might comprise a malicious SQL embedded into a field, such as username="abc'); DELETE FROM user_table; //". The back-end application would use an appropriate escape function to escape special characters of "username" and then save it with the new record with:
$username=mysqli_real_escape_string($con, $_POST['username']);
$my_cmd="INSERT INTO user_table (username) VALUES ('{$username}');";
$con→execute($my_cmd);

This might not create any alarm, if the back-end code for handling the user registration is not vulnerable. However, sometime later, another piece of code that is vulnerable tries to fetch the "username" of this record and performs insertion operation below, without appropriate escaping:
mysqli_fetch_all($result, MYSQLI_ASSOC);
$username=$result[0]['username'];
// no appropriate escaping
$my_cmd="INSERT INTO new_user_table (username) VALUES ('{$username}');";
$con→execute($my_cmd)

This separate vulnerable code will generate the following SQL command:
INSERT INTO new_user_table (username) VALUES ('abc'); DELETE FROM user_table; //

This command will cause the table "user_table" to be deleted.

To handle the advanced attacks and web pages with non-query operations, the dynamic comparative analysis is still very efficient. In the above example (user registration page), the test application might contain two operations, first creating new database entry and second, trying to use the newly created entries with another operation, such as fetching all records and inserting them into another table. The second operation will generate different run-time behaviors for the secure test application and vulnerable test application. So, the second operation could be dynamically analyzed to determine whether a request is illegitimate.

Where needed, a few considerations exist to make the security appliance more efficient might be in place, such as caching and reuse, as described below.

Cache Detected SQL Injections

Figures 17, 18:
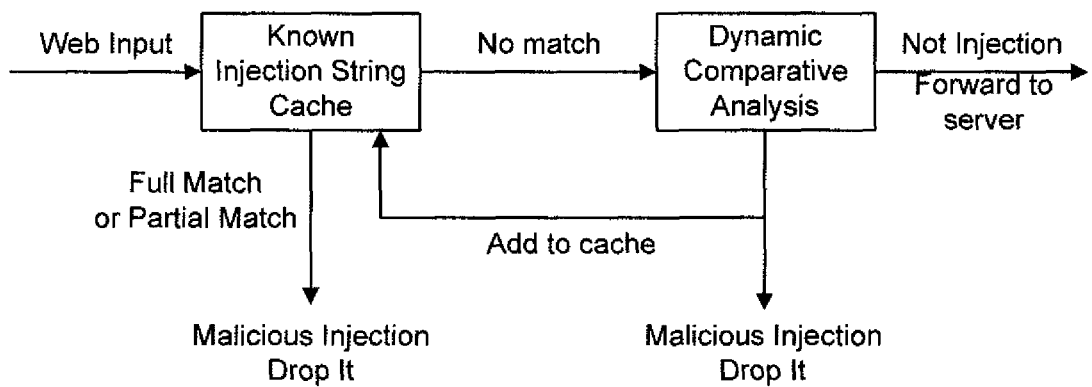
FIG. 17 is a block diagram of a caching arrangement.
FIG. 18 illustrates strings and partial matching.

Once the security appliance detects a new malicious SQL injection string, it can save it into a cache. The cache contains a list of known injection strings. The known injection string cache can be implemented in a fast string-matching hardware component, or a high efficiency software module. Before the security appliance invokes the dynamic comparative analysis, it might check web input strings against the cache, one by one. If a match occurs, including a partial match, the security appliance flags the input string as an illegitimate request and skips the relatively more costly dynamic comparative analysis. The dynamic comparative analysis is invoked only if none of the web input strings match the cache. This is illustrated in FIG. 17. The caching might be done by a caching module or an integrated portion of the security appliance.

A partial match can indicate that a string in the cache is a sub string of the input string. In the case of a partial match, the input string is still considered as an attack variant or otherwise illegitimate. This is illustrated in FIG. 18.

Using the cache to flag input strings and skipping the dynamic comparative analysis for strings that are already in the cache can save processing power, especially in situations where it is expected that a security appliance receiving a specific string will encounter many copies of perhaps that identical string from attackers. Some massive attacks use an identical attack vector repeatedly.

Re-use Instantiated Test Databases

The test database is instantiated at run time, since execution of the vulnerable application, especially on malicious input, may alter the database content. After the execution, if it is determined that any one of the two instantiated test databases are unaltered, they can be re-used for processing future requests.

Other Examples of Attack Vectors

Attack vectors that are SQL code injection vectors are not the only vulnerability the security appliance can deal with. Additional examples will now be described.

XML Injection Example

Figure 19:
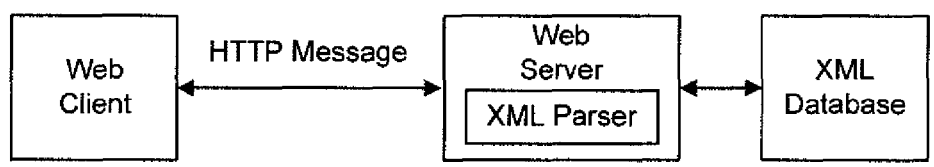
FIG. 19 is a block diagram illustrating XML request submission.

Similar to the SQL injection example, the XML injection example involves a web client, a web server and a database, as illustrated in FIG. 19. One difference is that the database stores information in XML format, not in SQL. The web server contains an XML parser that interacts with a backend XML database. In a XML database, the records are saved in XML format.

Figure 20:
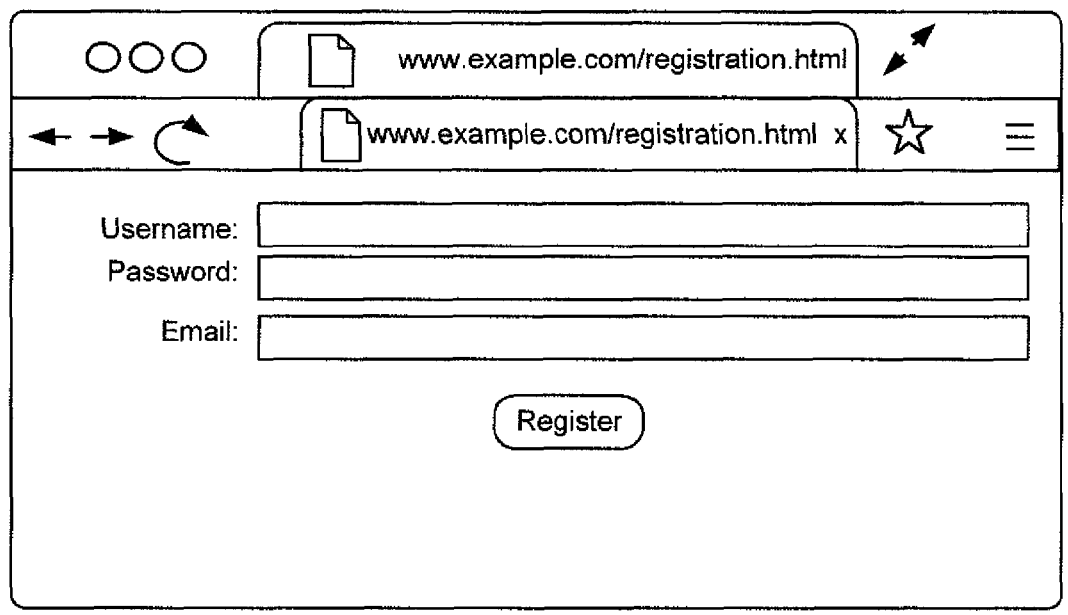
FIG. 20 is an example of a web page that might be used for XML request submission.

Consider a new user registration web page with the three fields shown in FIG. 20. The web requests that the user enter username, password and email address to generate a regular user account. The web page is not supposed to generate a root user account. On the backend, besides the above three fields, the web server automatically assigns a user ID to the regular user accounts generated by this web page. All generated user IDs are nonzero values. The user ID "0" is reserved for root users.

Figures 21, 22:
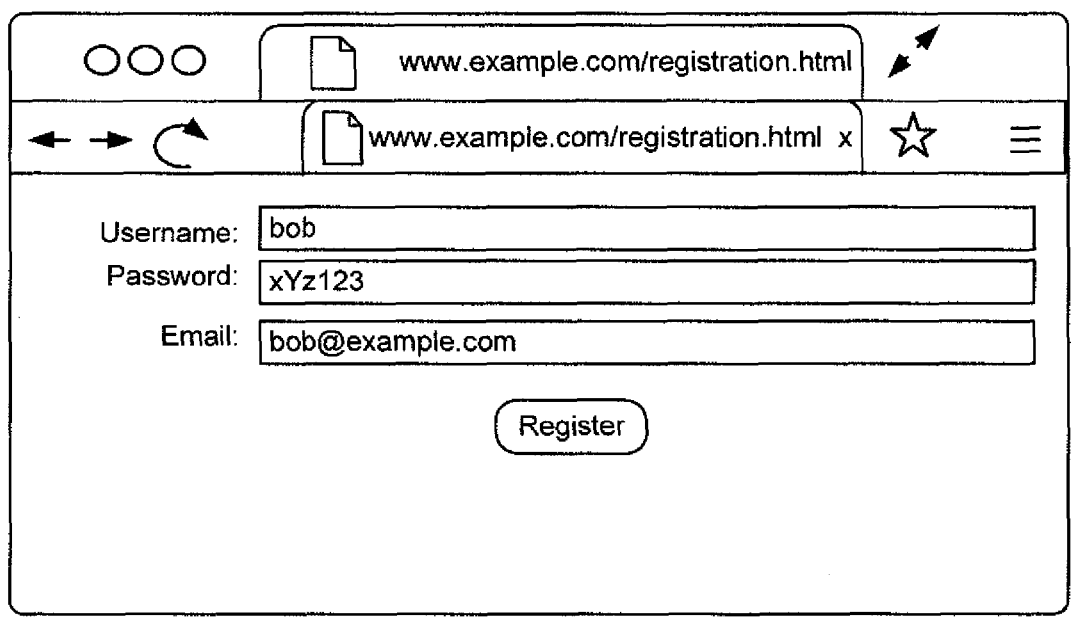
FIG. 21 illustrates an XML database.
FIG. 22 illustrates the web page of FIG. 20 with fields filled in with legitimate request.

The XML database stores the user accounts in the XML format shown in FIG. 21. In that example, it has a few user accounts, including one root user account ("root") and one regular user account ("alice").

If user enters legitimate information as below, in the web page, the web server will automatically generate a unique user ID and store the new user account to the XML database. In the example of FIG. 22, a new user account ("bob") is created with user ID 302, using legitimate web input. The updated XML database that results is illustrated in FIG. 23.

Suppose an attacker, through a separate channel, learned that user ID 0 is reserved for root user. The attacker can user the XML injection shown in FIG. 24 in the web page. This operation will generate a root user account "bob". The updated XML database that results is illustrated in FIG. 25. Note that since "<!—" and "-->" are the open delimiter and close delimiter for comments, the third user account is effectively as shown in FIG. 26. The injected user ID 0 overwrites the automatically generated user ID 302.

Similar to the SQL injection detection, the dynamic comparative analysis can be used here to detect the XML injection. An intermediate security appliance will run the web page input through the two test applications and then compare the run-time behaviors. The vulnerable application does not validate web input, while the secure application does. If any run-time behavior, e.g., the update to the test XML database, is different, the security appliance can flag that an XML injection attack or more generally as an illegitimate request.

OS Shell Command Injection Example

Figure 27:
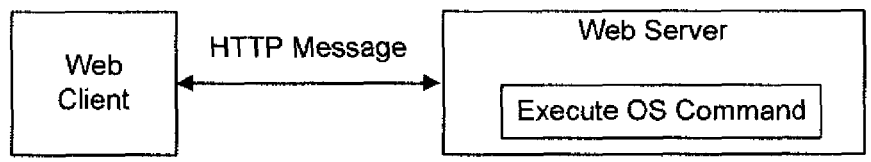
FIG. 27 is a block diagram illustrating operating system ("OS") request submission.

Another example is the OS shell command injection attack, which exploits vulnerable web applications that do not validate user input. OS shell command injection may or may not interact with a backend database. In an OS shell command injection, the web application directly executes dynamically generated OS commands based on user input, such as via an HTTP message from a web client to a web server that is capable of executing OS commands, as illustrated in FIG. 27.

Figure 28:
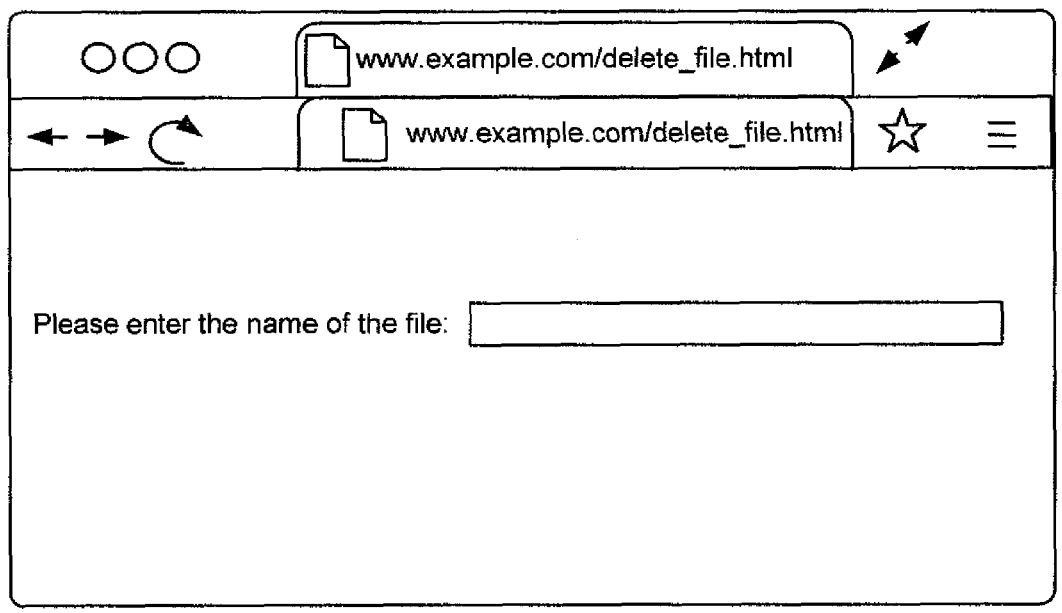
FIG. 28 is an example of a web page that might be used for OS request submission.

Consider a simple web page as shown in FIG. 28 that is used to get user input as to files to delete. The web page contains one line description and an input field. A vulnerable web application will directly call a system function to execute the file removal command "rm" to delete the file using a script like that of FIG. 29.

If an attacker provides "xyz.txt; id" as the file name, it will make the vulnerable application execute two commands, "rm xyz.txt" and "id", since ";" signals a delimiter between concatenated individual OS commands. The operating system will remove the file as expected, but will also disclose the user identity information with an output such as that illustrated in FIG. 30.

To detect OS shell command injection attacks, the vulnerable and secure testbeds might include a testing OS environment. It could be simulated in software or real OS running from a virtual machine. Similarly, the security appliance can compare the input's change to the OS environment and the output it receives. For the above example, the additional output of the identity information will differentiate the attacking input from normal legitimate input.

Example Hardware

Several of the modules, systems, testbeds, etc. described herein can be implemented entirely in software and memory storage. Alternatively, for speed, cost, ease of use, or other reasons, some or all parts of such elements might be implemented in hardware. In some cases, the modules, systems, testbeds, etc. are implemented as a processor, such as a CPU, executing program code or instructions stored in non-transitory computer memory or media.

Typically, the CPU capable of processing instructions for execution that it reads from program code storage, which might be RAM, ROM, flash, magnetic storage, etc. The CPU may be designed using any of a number of architectures, such as a CISC (Complex Instruction Set Computer) processor, a RISC (Reduced Instruction Set Computer) processor, or a MISC (Minimal Instruction Set Computer) processor. The CPU might be a single-threaded processor or a multi-threaded processor. Additional functionality might be provided by a graphics I/O system and processor.

In some implementations, the memory used is a computer-readable medium, such as a volatile memory unit or a non-volatile memory unit. Various storage devices might be capable of providing mass storage for various needs. For example, in one implementation, storage devices comprise flash drive devices, floppy disk devices, hard disk devices, optical disk devices, tape devices, or the like.

Input/output devices might include a keyboard and/or pointing device and a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data. Storage devices suitable for tangibly embodying computer program instructions and data include many forms of non-volatile memory, including, by way of example, semiconductor memory devices, such as EPROM, EEPROM, and flash memory devices, magnetic disks such as internal hard disks and removable disks, magneto-optical disks; and CD-ROM and DVD-ROM disks.

The processor and the memory can be supplemented by, or incorporated in, ASICs (application-specific integrated circuits). To provide for interaction with a user, the features can be implemented on a computer having a display device such as a CRT (cathode ray tube) or LCD (liquid crystal display) monitor for displaying information to the user and a keyboard and a pointing device such as a mouse or a trackball, or a touchscreen, by which the user can provide input to the computer. Additionally, such activities can be implemented via touchscreen flat panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by some form or medium of digital data communication such as a communication network. Examples of communication networks include a local-area network ("LAN"), a wide-area network ("WAN"), peer-to-peer networks (having ad-hoc or static members), grid computing infrastructures, and the Internet.

The computer hardware described herein might be used with the computer software described herein unless otherwise indicated. The software can be written in one or more languages and be stored in different forms of memory or storage. The computer hardware described and illustrated might include various forms of digital computers, such as laptops, desktops, workstations, personal digital assistants, servers, blade servers, mainframes, and other appropriate computers.

The computer system can include clients and servers. A client and server are generally remote from each other and typically interact through a network. The relationship of client and server arises by virtue of computer programs running on the respective computers and having a client-server relationship to each other.

As explained herein, a security appliance can include a vulnerable testbed that simulates at least one known vulnerability, and a secure testbed that simulates not having that vulnerability. A testbed monitor monitors run-time behavior of the vulnerable testbed and the secure testbed, obtaining at least one run-time behavior parameter. A comparative evaluator module compares the run-time behavior parameters with respect to the received client request to determine if it is legitimate or illegitimate. The security appliance outputs its determination with a message and/or by forwarding client requests deemed legitimate and dropping client requests deemed illegitimate. The determination can be based, on differences in the run-time behavior parameters. Illegitimate requests can be cached for later matching. The requests can be database data requests, XML formatted requests, operating system requests and/or other types of requests that would be differentially handled by a vulnerable server and a secure server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations are within the scope of the following claims. Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Further embodiments can be envisioned to one of ordinary skill in the art after reading this disclosure. In other embodiments, combinations or sub-combinations can be advantageously made. The specification and figures are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A security appliance that is present in a network path between client computers or computing devices and a secured server, the security appliance comprising:
    a network interface over which client requests for the secured server can be received;
    a vulnerable testbed, wherein the vulnerable testbed is configured to simulate a vulnerable server response to a received client request, simulated to have at least one known vulnerability;
    a secure testbed, wherein the secure testbed is configured to simulate a server response to the received client request, simulated to not have the at least one known vulnerability;
    a testbed monitor that monitors run-time behavior of the vulnerable testbed and the secure testbed, obtaining at least one run-time behavior parameter;
    a comparative evaluator module that compares the at least one run-time behavior parameter for each of the vulnerable testbed and the secure testbed with respect to the received client request; and
    a test output that signals whether the security appliance determines the received client request to be a legitimate request or an illegitimate request, wherein the determination is based, at least in part, on any differences in the run-time behavior parameter for each of the vulnerable testbed and the secure testbed.

2. The security appliance of claim 1, wherein the test output signals the determination of a legitimate request by sending the legitimate request to the secured server and the security appliance is configured to drop illegitimate requests without sending to the secured server.

3. The security appliance of claim 1, wherein the test output signals the determination by sending a message to the secured server indicating the determination.

4. The security appliance of claim 3, wherein the message to the secured server includes data identifying the received client request.

5. The security appliance of claim 1, wherein the determination is based on whether the run-time behavior parameter for the vulnerable testbed exactly matches the run-time behavior parameter for the secure testbed, such that if the received client request results in any difference between the run-time behavior parameter for the vulnerable testbed and the run-time behavior parameter for the secure testbed, the determination is that the received client request is an illegitimate request, otherwise the determination is that the received client request is a legitimate request.

6. The security appliance of claim 1, wherein the determination is based on whether the run-time behavior parameter for the vulnerable testbed is not an exact match but is within a tolerance percentage specified by a tolerance percentage value readable from memory by the security appliance, such that if the received client request results in differences within the tolerance percentage, the determination is that the received client request is a legitimate request, otherwise the determination is that the received client request is an illegitimate request.

7. The security appliance of claim 1, wherein each of the testbeds comprises a database management system with replaceable test data.

8. The security appliance of claim 7, further comprising a reset module to reset each of the testbeds with replaceable test data and initial state for subsequent comparative analysis.

9. The security appliance of claim 8, wherein the reset module bypasses a reset if no changes were made by testing the received client request.

10. The security appliance of claim 1, wherein the vulnerable testbed is configured to allow execution of any data sent in a client request and the secure testbed is configured to block execution of unexpected commands.

11. The security appliance of claim 1, wherein the testbeds are simplified versions of a secured server application and database.

12. The security appliance of claim 1, wherein the testbeds are programmatically generated.

13. The security appliance of claim 1, wherein the testbeds are programmatically generated in part and in part manually generated based on user input.

14. The security appliance of claim 13, wherein the user input comprises user configurable parameters including test data set size and an indication of a selected pre-configured application template.

15. The security appliance of claim 1, further comprising:
a caching module that caches the received client request when the security appliance determines the received client request to be an illegitimate request; and
a cache checking module that checks a new, unprocessed client request against cached previously received illegitimate requests, and if there is at least a partial string match, the security appliance determines the received client request to be an illegitimate request.

16. The security appliance of claim 15, wherein the cache checking module is configured to operate on the new, unprocessed client request prior to the new, unprocessed client request being used in the vulnerable testbed or in the secure testbed, and the cache checking module is configured to bypass the testbeds if the security appliance determines the received client request to be an illegitimate request based on the cached previously received illegitimate requests.

17. A method for testing client requests for legitimacy using security appliance that is present in a network path between client computers or computing devices and a secured server, the method comprising:
receiving a client request over a network interface over which client requests for the secured server can be received;
configuring a vulnerable testbed to simulate a vulnerable server response to a received client request, simulated to have at least one known vulnerability;
configuring a secure testbed to simulate a server response to the received client request, simulated to not have the at least one known vulnerability;
monitoring, using a testbed monitor, run-time behavior of the vulnerable testbed and the secure testbed;
obtaining at least one run-time behavior parameter from the run-time behavior;
comparing the at least one run-time behavior parameter for each of the vulnerable testbed and the secure testbed with respect to the received client request; and
outputting a test output that signals whether the security appliance determines the received client request to be a legitimate request or an illegitimate request, wherein the determination is based, at least in part, on any differences in the run-time behavior parameter for each of the vulnerable testbed and the secure testbed.

18. The method of claim 17, wherein outputting the test output comprises sending the legitimate request to the secured server and dropping illegitimate requests without sending to the secured server.

19. The method of claim 17, wherein outputting the test output comprises sending a message to the secured server indicating the determination.

20. The method of claim 19, wherein the message to the secured server includes data identifying the received client request.

21. The method of claim 17, wherein the determination is based on whether the run-time behavior parameter for the vulnerable testbed exactly matches the run-time behavior parameter for the secure testbed, such that if the received client request results in any difference between the run-time behavior parameter for the vulnerable testbed and the run-time behavior parameter for the secure testbed, the determination is that the received client request is an illegitimate request, otherwise the determination is that the received client request is a legitimate request.

22. The method of claim 17, wherein the determination is based on whether the run-time behavior parameter for the vulnerable testbed is not an exact match but is within a tolerance percentage specified by a tolerance percentage value readable from memory by the security appliance, such that if the received client request results in differences within the tolerance percentage, the determination is that the received client request is a legitimate request, otherwise the determination is that the received client request is an illegitimate request.

23. The method of claim 17, further comprising populating each of the testbeds with a database management system with replaceable test data.

24. The method of claim 23, further comprising resetting each of the testbeds following a test with replaceable test data and initial state for subsequent comparative analysis.

25. The method of claim 24, further comprising bypassing a reset if no changes were made by testing the received client request.

26. The method of claim 17, further comprising configuring the vulnerable testbed to allow execution of any data sent in a client request and configuring the secure testbed to block execution of unexpected commands.

27. The method of claim 17, further comprising configuring the testbeds as simplified versions of a secured server application and database.

28. The method of claim 17, further comprising programmatically generating the testbeds.

29. The method of claim 17, further comprising programmatically generating the testbeds in part and manually generating in part based on user input.

30. The method of claim 29, further comprising receiving the user input as user configurable parameters including test data set size and an indication of a selected pre- configured application template.

31. The method of claim 17, further comprising:
caching the received client request when the security appliance determines the received client request to be an illegitimate request; and
checking a new, unprocessed client request against cached previously received illegitimate requests, and if there is at least a partial string match, determining by the security appliance that the received client request is an illegitimate request.

32. The method of claim 31, wherein checking further comprises:
operating on the new, unprocessed client request prior to the new, unprocessed client request being used in the vulnerable testbed or in the secure testbed; and
bypassing the testbeds if the security appliance determines the received client request to be an illegitimate request based on the cached previously received illegitimate requests.

* * * * *